Dec. 10, 1957 — L. E. SEYMOUR ET AL — 2,815,979
MEANS FOR ATTACHING HEADLINING WIRES
Filed Sept. 27, 1954
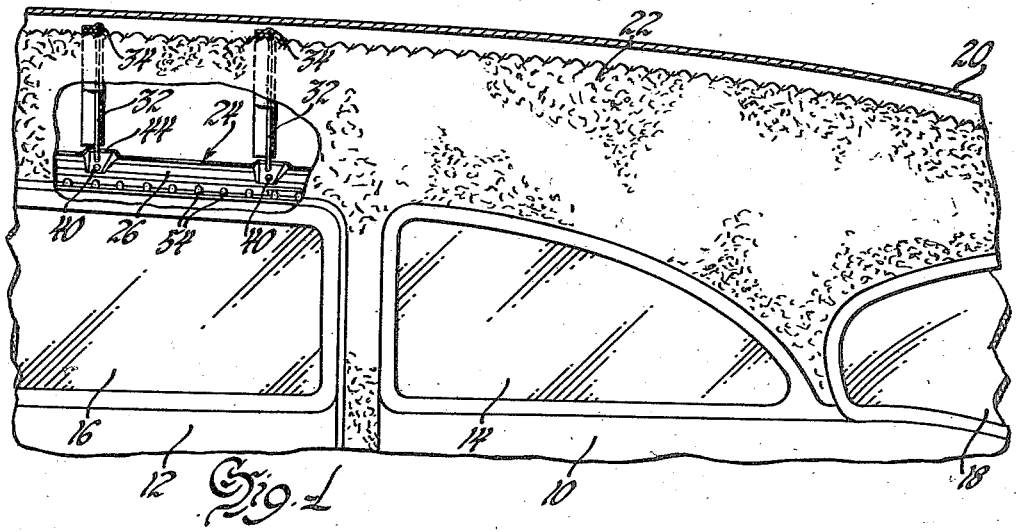
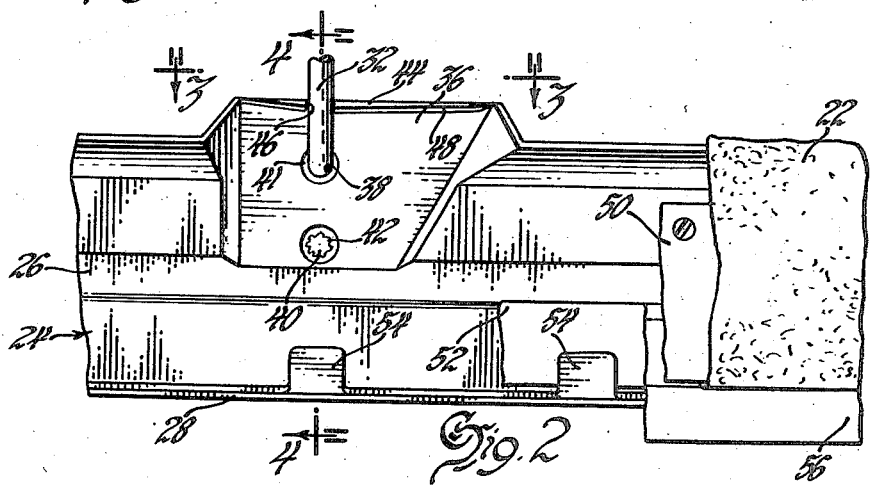
INVENTORS
John E. Tessmar &
BY Leo E. Seymour
Paul Hitzpatrick
ATTORNEY United States Patent Office 2,815,979
Patented Dec. 10, 1957

2,815,979

MEANS FOR ATTACHING HEADLINING WIRES

Leo E. Seymour and John E. Tessmar, Detroit, Mich., assignors to General Motors Corporation, Detroit, Mich., a corporation of Delaware Application September 27, 1954, Serial No. 458,418

7 Claims. (Cl. 296—137)

This invention relates to an automobile roof support structure, and more particularly to a headliner supporting means in an automobile.

Spaced below the metal roof of an automobile there is a flexible headliner which may be of fabric, leather or the like. The headliner is supported by a plurality of parallel listing wires which extend transversely across the roof and are secured to the side roof rails at opposite sides of the roof member. These listing wires are located in the space between the roof member and the headliner, generally extending through pockets formed in the upper side of the headliner.

In the past these wires have been held in place by screws, clips, or other separate pieces secured to the side roof rails, and it has been a relatively slow and expensive procedure to mount the headliner and listing wires on the automobile body.

This invention provides a novel and improved means for mounting the headliner listing wires on the side roof rails of the automobile body. According to the invention, no separate parts are employed and the inner panel of the side roof rail (which is a stamping) is formed in its manufacture with means for holding and supporting the listing wires so that it is merely necessary to insert the listing wires in the holding and supporting means on the opposite side rails, and there are no separate parts for securing the listing wires in place. The invention greatly facilitates the construction of this portion of an automobile body and reduces the cost of the body in mass production assembly operations.

Other features and advantages of the invention will be apparent from the following description and from the drawings, in which:

Fig. 1 is a fragmentary inside view of a portion of the roof and side of an automobile body, parts being broken away to show underlying structure;

Fig. 2 is an enlarged side elevation of a portion of the side roof rail;

Fig. 3 is a top plan view of a portion of the rail taken along the line 3—3 of Fig. 2; and Fig. 4 is a transverse section through the rail taken along the line 4—4 of Fig. 2.

Referring now more particularly to the drawings, an automobile body has a rear quarter panel 10 and a door 12, there being a window 14 in the quarter panel and a window 16 in the door. The rear window of the automobile is shown at 18 and the sheet metal roof is indicated at 20. Below the roof there is a flexible headliner 22 which may be formed of fabric, leather, or the like. If desired, insulating material may be located between the sheet metal roof 20 and the headliner 22.

At its opposite sides the roof is flanked by a side roof rail designated generally at 24. Since these rails are similar, only one is illustrated. As shown best in Fig. 4, each side rail comprises a generally vertical inner panel 26 and an outer panel 28. The roof 20 is welded to the outer panel 28, the outer edge of the roof being flanked by a drip gutter 30.

The headliner is supported and held in place by a plurality of spaced parallel bowed listing wires 32. In a sedan body, there may be seven of these wires and in a coupe there may be five or six wires. As shown in Fig. 1, the wires are located in the space between the roof panel 20 and the headliner 22, being secured in pockets 34 formed in the headliner. In the past, the bowed listing wires 32 have been secured (at least at one end) by means of separate loose clips, screws or the like. According to this invention, such separate loose members are eliminated, and when the roof rail inner panel 26 is manufactured, supporting and holding means are stamped into it as a part of the manufacturing operation. Assembly of the listing wires and headliner is greatly facilitated by the omission of separate screw or clamping means.

Each of the roof rail inner panels 26 is formed at each listing wire location with a depressed portion 36 (see Fig. 3) and in vertical alignment at the location of the listing wires two burred holes 38 and 40 are punched in the panel 26. These burred holes are deliberately not cleanly punched, but there is an outwardly extending apron 41 with ragged edges 42 framing each hole. These burred holes are formed with a pointed punch and may be compared to a hole formed by driving an ordinary nail through a tin can. The ragged edges 42 act as barbs to hold the listing wires in place as will be hereinafter described.

Across the top of the depressed portion 36 of the panel 26 an integral flange 44 is bent, the flange lying in a horizontal plane and extending inwardly of the automobile body. Directly above the holes 38 and 40 the flange has a transverse slot 46 which opens into the inner edge 48 of the flange. In order to mount the headliner 22 in the automobile body, the opposite ends of each listing wire are inserted in upper holes 38 or lower holes 40, as selected, in each side roof rail. The amount of insulation between the headliner 22 and the roof panel 20 determines whether the upper holes 38 or the lower holes 40 will be used. Each of the wires 32 fits closely in the respective slots 46 and holes 38 or 40 so that the wires are held and supported firmly without the need for any separate screws, clips, or clamping members.

Fig. 2 shows a clamping strip 50 which may be secured by screws to the roof rail and the lower edge of the headliner 22 may be clamped under this strip to provide a neat finish for the structure. Beneath the clamping strip 50 there is a tacking strip 52 held by tabs 54 which are bent from the roof rail inner panel 26, and a windhose 56 may be secured to this tacking strip beneath the clamping strip 50, if desired.

While we have shown and described one embodiment of our invention, it is capable of many modifications. Changes, therefore, in the construction and arrangement may be made without departing from the spirit and scope of the invention as set forth in the appended claims.

We claim:

1. An automobile roof support structure of the character described, including: a generally vertical side roof rail inner panel having a hole in a generally vertical face; a rigid horizontal flange projecting inwardly from said inner panel and having a transverse slot opening into its inner edge above said hole; and a bowed support wire extending through said slot, said wire extending along the inner side of said face below said slot and having its end bent outwardly at substantially a right angle and inserted in said hole, the wire fitting closely in said slot and hole and being held and supported thereby.

2. Apparatus of the character claimed in claim 1, wherein said hole is burred, there being an outwardly extending apron with ragged edges framing said hole.

3. An automobile roof support structure of the character described, including: a side roof rail inner panel having a burred hole in a generally vertical face thereof, there being an outwardly extending apron with ragged edges framing said hole; a rigid horizontal flange integral with said inner panel, said flange projecting inwardly from said panel and having a transverse slot opening into its inner edge above said hole; and a bowed support wire extending through said slot, said wire extending along the inner side of said face below said slot and having its end bent outwardly at substantially a right angle and inserted in said hole, the wire fitting closely in said slot and hole and being held and supported thereby.

4. An automobile roof support structure of the character described, including: a side roof rail comprising generally vertical inner and outer panels having a space therebetween, said inner panel having at least one hole in a generally vertical face thereof; a rigid horizontal flange projecting inwardly from said inner panel and having a transverse slot opening into its inner edge above said hole; and a bowed support wire extending through said slot, said wire extending along the inner side of said face below said slot and having its end bent outwardly at substantially a right angle and inserted in said hole, so that the end of the wire projects into said space, the wire fitting closely in said slot and hole and being firmly held and supported thereby.

5. An automobile roof support structure of the character described, including: a side roof rail comprising generally vertical inner and outer panels having a space therebetween, said inner panel having at least one burred hole in a generally vertical face thereof, there being an apron with ragged edges framing said hole and extending into said space; a rigid horizontal flange integral with said inner panel, said flange projecting inwardly from said inner panel and having a transverse slot opening into its inner edge above said hole; and a bowed support wire extending through said slot, said wire extending along the inner side of said face below said slot and having its end bent outwardly at substantially a right angle and inserted in said hole, so that the end of the wire projects into said space, the wire fitting closely in said slot and hole and being firmly held and supported thereby.

6. An automobile roof support structure of the character described, including: a roof member; opposite side roof rails flanking said roof member, each rail having a generally vertical inner panel having a hole in a generally vertical face thereof; a rigid horizontal flange projecting inwardly from said inner panel and having a transverse slot opening into its inner edge above said hole; a flexible headliner adjacent said roof member; and a bowed support wire extending transversely across said roof in supporting relation with said headliner, said wire at each end extending through said slot in the adjacent roof rail, and each end of the wire extending along the inner side of said face below said slot and having its end bent outwardly at substantially a right angle and inserted in the adjacent hole, the wire fitting closely in said slot and hole and being held and supported thereby.

7. An automobile roof support structure of the character described, including: a roof member; opposite side roof rails flanking said roof member, each rail comprising generally vertical inner and outer panels having a space therebetween, said inner panel having at least one burred hole in a generally vertical face thereof, there being an apron with ragged edges framing said hole and extending into said space; a rigid horizontal flange integral with said inner panel, said flange projecting inwardly from said inner panel and having a transverse slot opening into its inner edge above said hole; a flexible headliner adjacent said roof member; and a bowed support wire extending transversely across said roof in supporting relation with said headliner, said wire at each end extending through said slot in the adjacent roof rail, and each end of the wire extending along the inner side of said face below said slot and having its end bent outwardly at substantially a right angle and inserted in the adjacent hole so that the end of the wire projects into said space, the wire fitting closely in said slot and hole and being held and supported thereby.

References Cited in the file of this patent

UNITED STATES PATENTS

| | | |
|---|---|---|
| 2,239,318 | Haberstump | Apr. 22, 1941 |
| 2,390,193 | Tandetzke | Dec. 4, 1945 |